United States Patent
Attanasio et al.

(10) Patent No.: US 7,930,381 B2
(45) Date of Patent: Apr. 19, 2011

(54) EFFICIENT MONITORING OF HETEROGENEOUS APPLICATIONS

(75) Inventors: Luisa Attanasio, Moliterno (IT); Giancarlo Carbone, Rome (IT); Giuseppe Ciano, Rome (IT); Francesco Lecciso, Rome (IT); Luigi Pichetti, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 12/325,222

(22) Filed: Nov. 30, 2008

(65) Prior Publication Data
US 2009/0144420 A1 Jun. 4, 2009

(30) Foreign Application Priority Data
Dec. 4, 2007 (EP) .................................. 07122316

(51) Int. Cl.
*G06F 15/173* (2006.01)
(52) U.S. Cl. ........ 709/223; 709/224; 709/229; 715/736; 717/120
(58) Field of Classification Search .................. 717/127, 717/151, 154, 120–121; 709/223–224, 226, 709/229; 715/734–736
See application file for complete search history.

(56) References Cited

U.S. PATENT DOCUMENTS

| | | | |
|---|---|---|---|
| 5,535,195 A | 7/1996 | Lee | |
| 6,128,657 A | 10/2000 | Okanoya et al. | |
| 6,714,976 B1 * | 3/2004 | Wilson et al. | 709/224 |
| 2003/0191837 A1 * | 10/2003 | Chen | 709/224 |
| 2007/0067433 A1 | 3/2007 | D'Alterio et al. | |

* cited by examiner

*Primary Examiner* — Salad Abdullahi
(74) *Attorney, Agent, or Firm* — Justin Dillon (57) ABSTRACT

A heterogeneous environment having applications and application enablers operating on application servers organized as a cluster is managed. The application servers are managed by a cluster management application. A system management application permits access to computing performance data provided by an operating system and reported to the system management application. Performance data of the applications and application enablers is collected from an application agent through the application servers. Topology information regarding the application servers is collected via the cluster management application. The performance data and the topology information are retrieved and sent to the system management application. Access to the performance data via the system management application is permitted. The system management application links to the computing performance data using the topology information.

20 Claims, 6 Drawing Sheets

EFFICIENT MONITORING OF HETEROGENEOUS APPLICATIONS

RELATED APPLICATIONS

The present patent application claims priority under 35 USC 119 to the previously filed European (EP) patent application filed on Dec. 4, 2007, and assigned application no. 07122316.8.

FIELD OF THE INVENTION

The present invention generally relates to system management. More particularly, the present invention provides an integrated system management for operating systems, hardware equipment, and performance indicators originating from business applications running within a clustered environment.

BACKGROUND OF THE INVENTION

System management products allow a company to efficiently manage its information technology (IT) infrastructure while controlling its expenses and improving its service level. As examples, the Tivoli® server products available from International Business Machines Corp., of Armonk, N.Y., as well as network and device management products, provide an end-to-end view of an IT infrastructure for resource allocation, monitoring, and provisioning, and also can provide problem prevention and resolution capabilities. Monitoring products manage the health and availability of IT infrastructure in an end-to-end manner, including operating systems, databases, and servers within the infrastructure, across distributed and host environments.

However, such monitoring products do not provide for monitoring the activity of business applications and business application enablers. Application enablers integrate software applications with document and process management process. Hundreds of applications, such as enterprise resource planning (ERP) applications, customer relationship management (CRM) applications, as well as accounting and other transactional systems, have been "application enabled." In this respect, they allow users to index and retrieve documents without leaving the applications themselves.

Because application enablers operate as an extension of a familiar interface, the disruption to an employee's routines is minimal. The custom integration provided by an application enabler matches the user's requirements and are flexible enough to change and evolve alongside the business. Business activity monitoring in real time allows activities such as leadership development, engagement, service, and satisfaction to be measured. The information collected from applications and application enablers include various metrics that are known as key performance indicators (KPI's).

However, business activity monitoring is typically not correlated with the monitoring of the availability and performance of IT systems. As such, IT administrators cannot proactively remediate business activity issues when they result from availability and performance problems of their underlying IT systems. Key business performance indicators may deteriorate because of problems with the operating system or hardware of the application servers on which the business applications or application enablers are running. Furthermore, when the application servers that are used to host applications and application enablers are structured in complex clustered topologies using middleware software layers for integration, it is difficult at best to correlate KPI's to relevant operating system and hardware performance data.

SUMMARY OF THE INVENTION

The present invention relate to the efficient monitoring of heterogeneous applications. A method of one embodiment of the invention is for managing a heterogeneous environment having applications and application enablers operating on application servers organized as a cluster. The application servers are managed by a cluster management application. A system management application permits access to computing performance data provided by an operating system of a physical system, collected by an operating system agent installed on the physical system, and reported to the system management application.

The method collects performance data of the applications and the application enablers. This performance data is collected from an application agent on the physical system hosting the cluster management application and through the application servers operating on the physical system hosting the cluster management application. The method collects, through the cluster management application, topology information linking the application servers with the physical system on which the application servers operate. The method retrieves on the physical system hosting the cluster management application the performance data of the applications and the application enablers, and the topology information.

The method further sends the performance data and the topology information as retrieved to the system management application. The method then permits access, via the system management application, to the performance data of the applications and the application enablers that have been sent. The method, using the topology information, also links the system management application to the computing performance data provided by the operating system of the physical system on which the applications and application enablers of the cluster operate.

A system of an embodiment of the invention includes application servers organized as a cluster, applications and application enablers operable on the application servers, a cluster management application to manage the application servers, a system management application, and a collection application. The system management application allows access to computing performance data provided by an operating system collected by an operating system agent and reported to the system management application.

The collection application collects, via the application servers, performance data of the applications and the application enablers. The collection application further collects, via the cluster management application, topology information regarding the application servers. The collection application then sends the performance data and the topology information to the system management application. The system management application is adapted to allow access to the performance data of the applications and the application enablers and, using the topology information that has been sent, to allow linking to the computing performance data provided by the operating system.

A computer-readable medium of one embodiment of the invention has a computer program stored thereon. The computer-readable medium may be a recordable data storage medium, or another type of tangible computer-readable medium. Upon execution, the computer program stored on the medium performs a method. The method is for managing a heterogeneous environment having applications and application enablers operating on application servers organized as a cluster. The application servers are managed by a cluster management application. A system management application permits access to computing performance data provided by an operating system of a physical system, collected by an operating system agent installed on the physical system, and reported to the system management application.

The method collects performance data of the applications and the application enablers. This performance data is collected from an application agent on the physical system hosting the cluster management application and through the application servers operating on the physical system hosting the cluster management application. The method collects, through the cluster management application, topology information linking the application servers with the physical system on which the application servers operate. The method retrieves on the physical system hosting the cluster management application the performance data of the applications and the application enablers, and the topology information.

The method further sends the performance data and the topology information as retrieved to the system management application. The method then permits access, via the system management application, to the performance data of the applications and the application enablers that have been sent. The method, using the topology information, also links the system management application to the computing performance data provided by the operating system of the physical system on which the applications and application enablers of the cluster operate.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

It is noted that prior art monitoring products do not provide for monitoring the activity of business applications and business application enablers. Application enablers integrate software applications with document and process management process. Hundreds of applications, such as enterprise resource planning (ERP) applications, customer relationship management (CRM) applications, as well as accounting and other transactional systems, have been "application enabled." In this respect, they allow users to index and retrieve documents without leaving the applications themselves.

Because application enablers operate as an extension of a familiar interface, the disruption to an employee's routines is minimal. The custom integration provided by an application enabler matches the user's requirements and are flexible enough to change and evolve alongside the business. Business activity monitoring in real time allows activities such as leadership development, engagement, service, and satisfaction to be measured. The information collected from applications and application enablers include various metrics that are known as key performance indicators (KPI's).

However, business activity monitoring is typically not correlated with the monitoring of the availability and performance of IT systems. As such, IT administrators cannot proactively remediate business activity issues when they result from availability and performance problems of their underlying IT systems. Key business performance indicators may deteriorate because of problems with the operating system or hardware of the application servers on which the business applications or application enablers are running. Furthermore, when the application servers that are used to host applications and application enablers are structured in complex clustered topologies using middleware software layers for integration, it is difficult at best to correlate KPI's to relevant operating system and hardware performance data.

Figure 1:
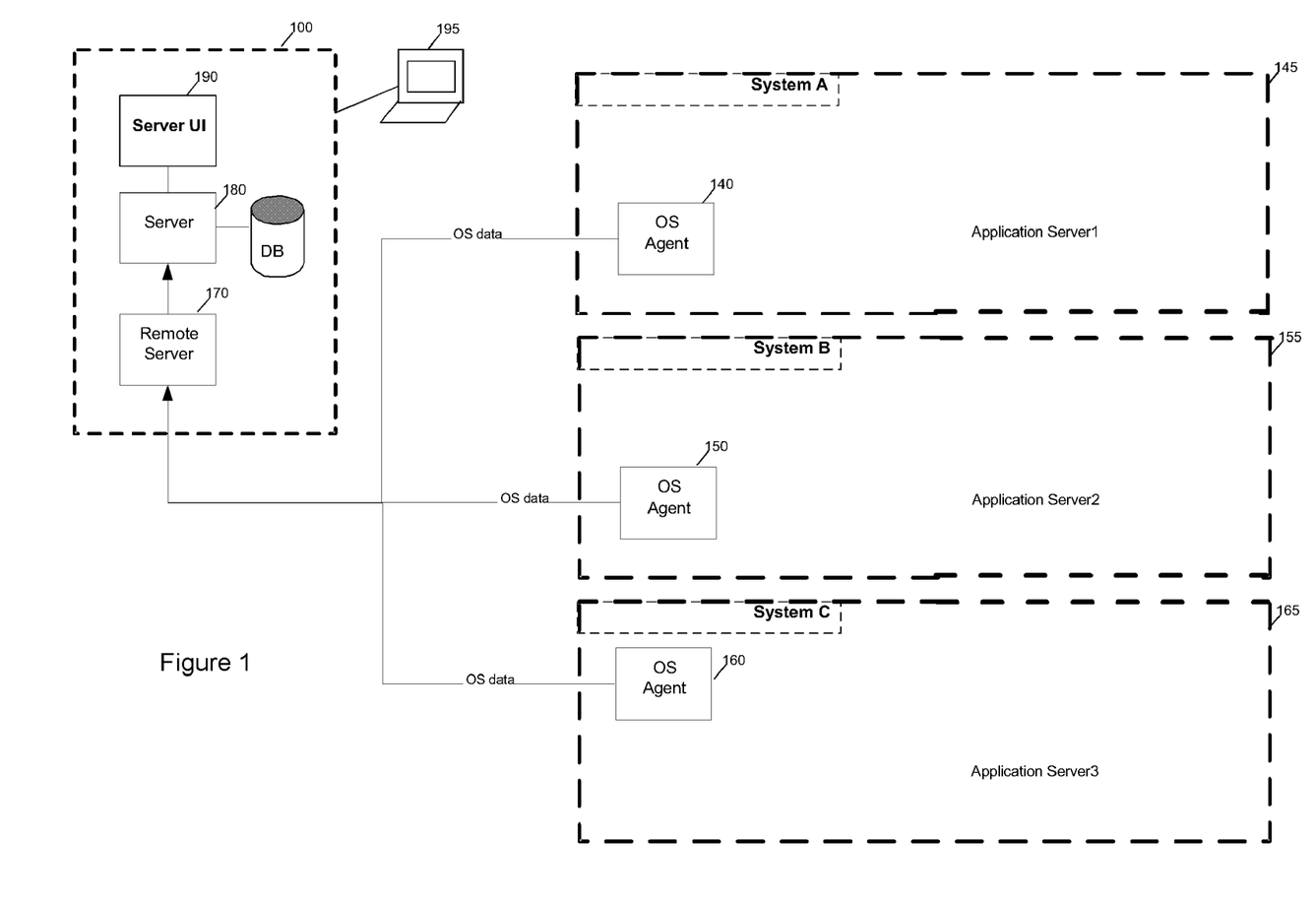
FIG. 1 is a diagram illustrating a system management implementation for monitoring distributed systems operating application servers within the prior art.

Therefore, FIG. 1 illustrates a system management implementation for monitoring distributed systems operating application servers in accordance with the prior art. One example of such a system managing product is the Tivoli® server monitoring product version 6.2 available from International Business Machines Corp., of Armonk, N.Y. The three systems, physical system A (145), physical system B (155), and physical system C (165), are in the example respectively operating the Application server 1, the Application server 2, and the Application server 3, which handle client requests to web servers through the Internet. The operating system on each physical system (145, 155, 165) generates performance data which are monitored by a system management mechanism having a centralized implementation (100) and a distributed implementation (140, 150, 160). The systems A, B, and C are physical systems in that they each include hardware, such as processors, memory, storage devices, and other types of hardware.

In the distributed implementation, one operating system (OS) agent (140 on 145, 150 on 155 and 160 on 165) operates on each system. The agents collect operating system performance data for each system. The information collected by the OS agents concern all computing resources, such as input/output (I/O) operations, as well as central processor unit (CPU) and storage parameters. Each agent is configured to report these performance data to a remote server (170) that is part of the centralized implementation (100) of the system management mechanism. For large installations, the remote server concentrates data from a group of agents for an instance for each enterprise location. The connections from distributed agents to the centralized system management may be transmission control protocol/Internet protocol (TCP/IP) connections.

The remote server (170) that interfaces the OS Agents transfers the performance data to a central server (180) which processes the data and archives it in a data base. This data is accessible from a system administrator console (195) through a user interface server (190). The system administrator performs online monitoring of computing resources displayed on the screen of the console and can react to a degraded situation by changing the configuration of these resources. The system administrator also can generate reports regarding this operating system information. When the system administrator uses the console for real-time monitoring, the performance information is displayed on the screen, and the administrator may also use the information processed and stored in the database for other system management operations, such as posteriori problem determination, system load balancing, system configuration plans, and so on.

Figure 2:
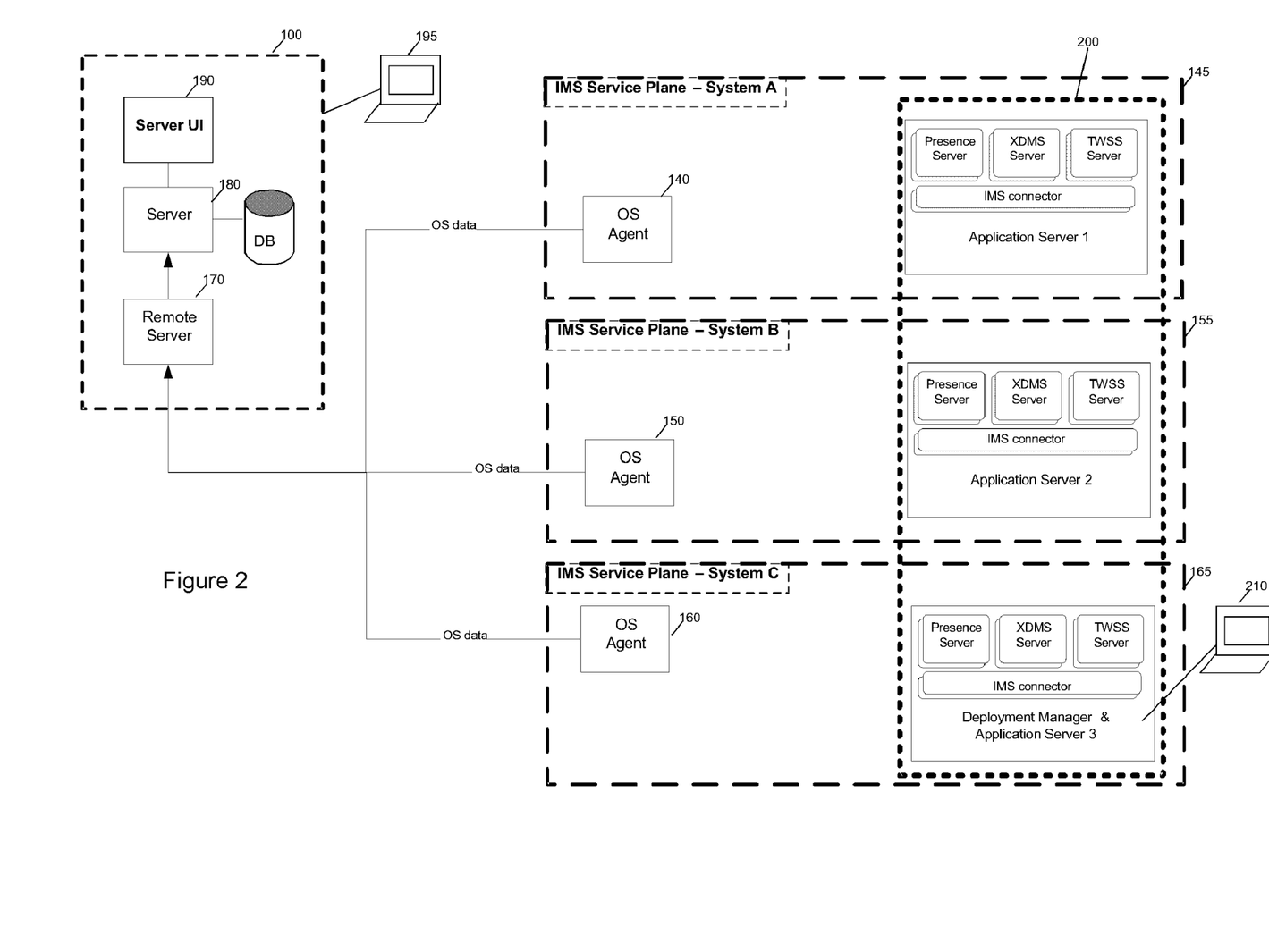
FIG. 2 is a diagram illustrating the monitoring of business data information of a cluster of application servers according to prior art.

FIG. 2 illustrates monitoring of business data information of a cluster of application servers in accordance with the prior art. In FIG. 2 the same distributed systems of FIG. 1 are used to operate application servers, which themselves operate IP multimedia system (IMS) application enablers. Examples of IMS application enablers include a Presence™ server (available from International Business Machines Corp.), an extended markup language data management server (XDMS), and a telecommunication web services server (TWSS). Application enablers integrate IMS applications distributed on other application servers. An additional layer, an IMS connector, is present to connect all the IMS applications.

According to standard definitions, a service plan is that which the IMS standard defines as the place where the application servers hosting IMS applications are run is thus built into each system. Additionally, an intermediate middleware is provided for server clustering, such as the WebSphere® application server network deployment middleware available from International Business Machines Corp., and allows horizontal and vertical clustering capabilities. A cluster is a virtual entity which can be managed through a deployment manager application, such as on system C (165). A deployment manager provides a single, central point of administrative control for the cluster members.

The application server 3 running on the same system (165) as the deployment manager has the capability of retrieving the key performance indicator (KPI) information, which includes performance data from the IMS applications running in the cluster. The KPI information for IMS applications includes network performance data, such as IMS application process IP multimedia data. For instance, session initiation protocol (SIP) may be collected for Internet control flow and data flow monitoring.

The system (165) and the application server 3 host an administrative console (210) for which a viewer application is implemented as, for instance, a servlet program on application server 3. The IMS administrator can monitor the performance of the IMS applications of the cluster by viewing all the KPI's from all the clustered IMS applications controlled by the deployment manager. FIG. 2 shows that the deployment management as it is not capable of reciprocal information with the system management mechanism described in FIG. 1, however.

Figure 3:
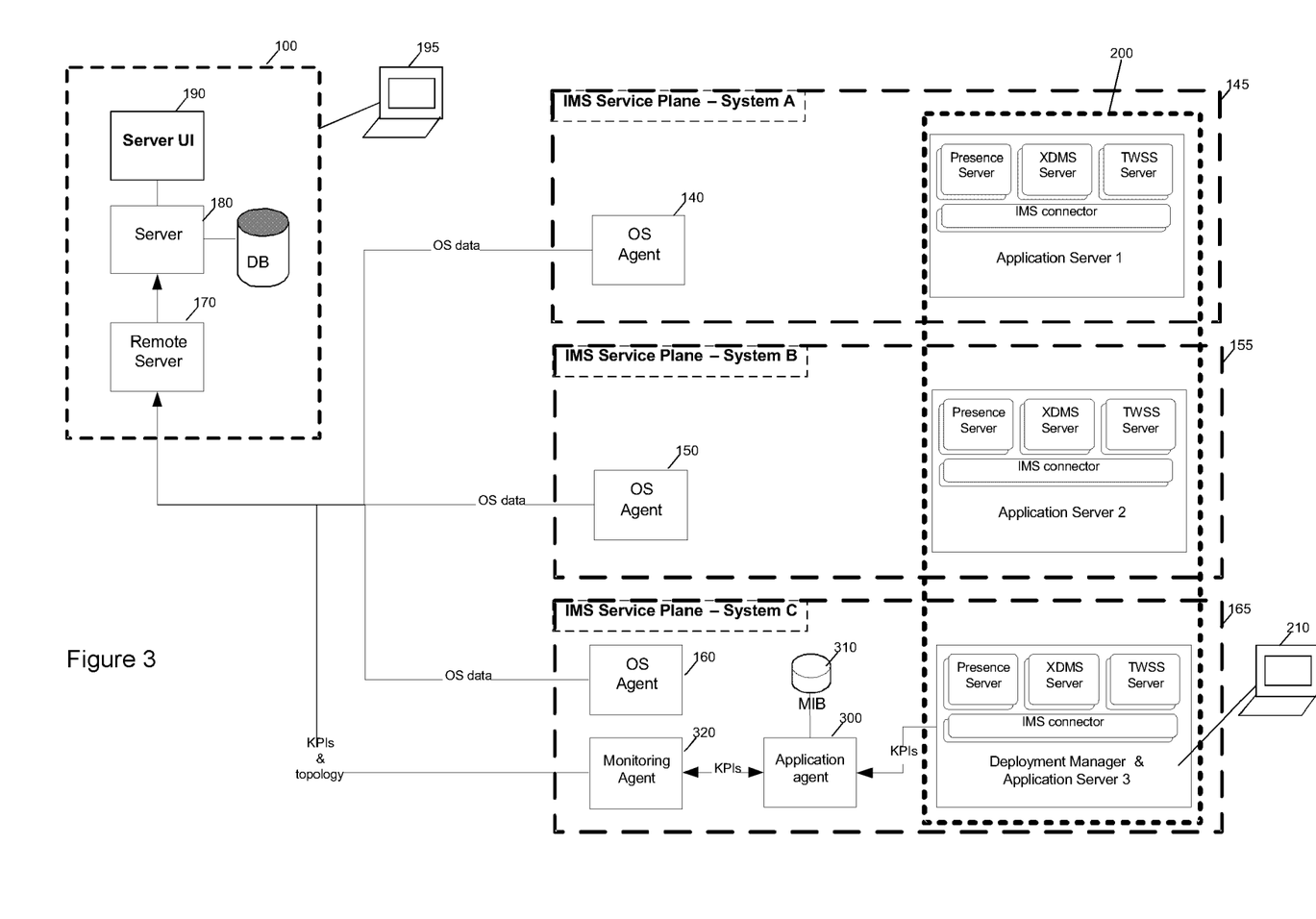
FIG. 3 is a diagram illustrating an implementation of integrated monitoring of distributed systems and of heterogeneous applications, according to a method of one embodiment of the invention.

As such, FIG. 3 illustrates an implementation for integrated monitoring of distributed systems and of heterogeneous applications, according to the method of an embodiment of the invention. In FIG. 3, the system management provided via FIG. 2 is presumed to have been implemented for management of the systems hosting the application servers. With the implementation of a new subsystem, specifically a collection application described in relation to FIG. 3, it is therefore possible to efficiently retrieve performance data of IMS applications and enablers, running in clusters, and the performance information of the systems hosting them. It is also possible to provide the capability to correlate such information and data providing a consistent user interface (UI) view and report navigation, via an efficient deployment of a minimal set of probes and monitors. The implementation includes an application agent (300) and a monitoring agent (320), where the application agent and the monitoring agent may be considered as part of the collection application.

A single application agent (300) per cluster (145) is installed on the deployment manager system (165). The application agent can be a simple network management protocol (SNMP) agent which collects the KPI values for all the applications of all the application servers of the cluster. The data is collected from the application server running on the same system, system C (165), on which the deployment manager runs. The KPI's relate to all the application servers (and to hosted enterprise applications if there are any) that belong to the same cluster. The SNMP protocol that can be used is described in Request for Comment (RFC) 1441 for SNMP version 2, available from the Internet Engineering Task Force at the Internet web site www.ietf.org. A management information base (MIB) table (310), for which the generic structure is provided by the SNMP protocol, contains variables adapted to the KPI's of the IMS applications and the application enablers. The MIB is maintained by the SNMP application agent in one embodiment of the invention.

Figure 4:
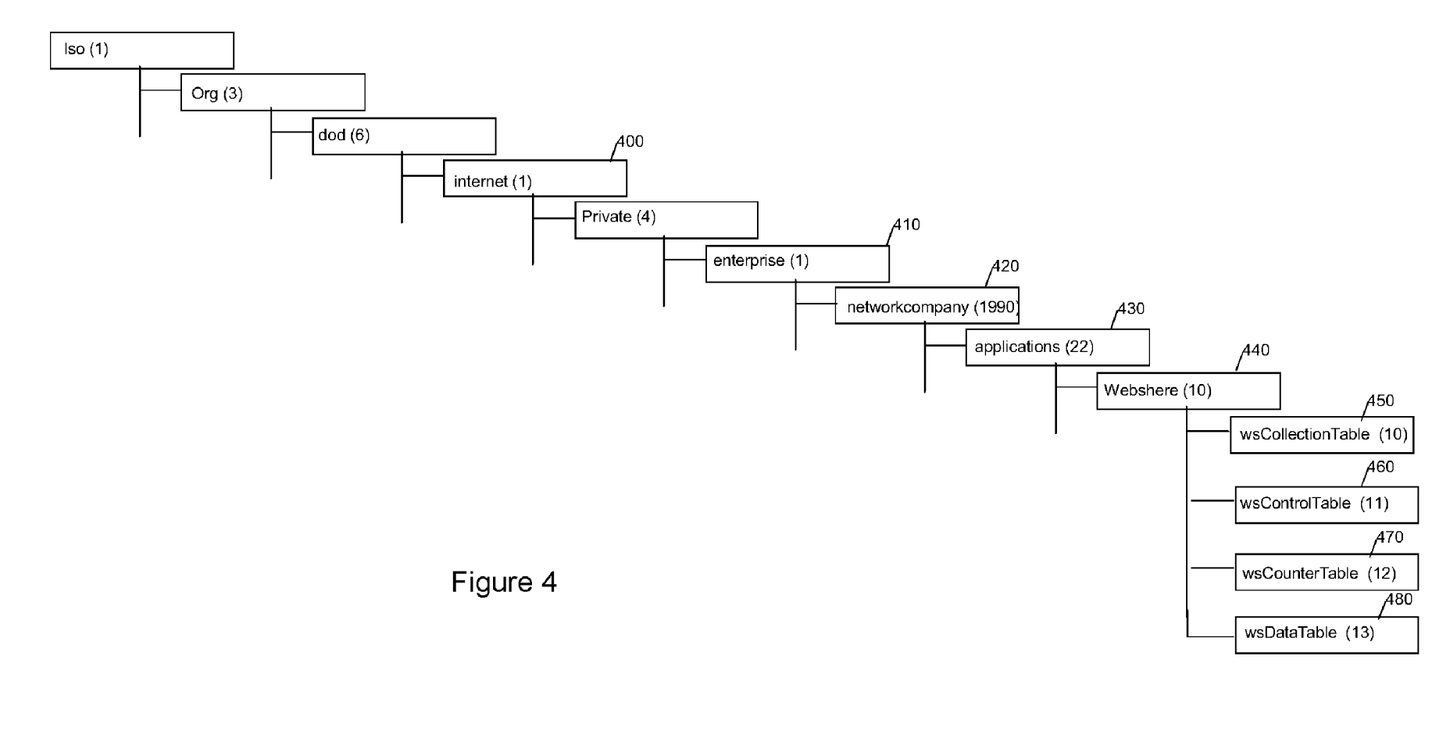
FIG. 4 is a diagram providing an example of a simple network management protocol (SNMP) management information base (MIB) containing key performance indicator (KPI) variables for the applications of a cluster, according to an embodiment of the invention.

FIG. 4 depicts an example of a SNMP MIB containing KPI variables for the applications of the cluster, according to an embodiment of the invention. The hierarchical structure of the MIB may be that imposed by the RFC 1441 that has been referenced above. The KPI's related to the Internet are under the Internet link (400). Under the private enterprise (410) link, the KPI's are attached to the name of the company here "Networkcompany" (420) that provides the IMS services. Under the Applications link (430), the identity of the WebSphere® application server application handling the clustered servers is attached. The data is saved over tables (450, 460, 470, 480).

More particularly, in one embodiment, for IMS applications, SIP traffic information is stored. An example of such SIP traffic information is as follows. wsControlTable content (450) indicates that the SIP counters described in the next link (460) have to be retrieved, via the following statement .1.3.6.1.4.1.1977.22.10.11.1.1.8000=.*SipContainer-Module$ In wsCounterTable (460) the counters to be retrieved including four counters. A first counter, in wsCounterTable, is the average number of messages handled by the container calculated over configurable period, such as .1.3.6.1.4.1.1977.22.10.12.1.1.8000.137=Active SIP Session A second counter, in wsCounterTable, is the size of the invoke queue in the WebSphere® application server, such as .1.3.6.1.4.1.1977.22.10.12.1.1.8000.136=Queue Size A third counter, in wsCounterTable, is the average number of new SIP application sessions created in the container and calculated over configurable period, such as .1.3.6.1.4.1.1977.22.10.12.1.1.8000.135=New SIP Application sessions)

A fourth counter, in wsCounterTable, is the average amount of time, in milliseconds, that passes from the time the message is sent to the container to the time the container sends a response, such as .1.3.6.1.4.1.1977.22.10.12.1.1.8000.134=Response Time In this embodiment the CollectionTable (450) contains indices to retrieve data and to identity the server they belong to, since the wsDataTable contains the actual information. One example for an active SIP session is:

.1.3.6.1.4.1.1977.22.10.13.1.1.8000.137.587=123
.1.3.6.1.4.1.1977.22.10.13.1.1.8000.137.588=1
.1.3.6.1.4.1.1977.22.10.13.1.1.8000.137.589=199

In this example, the CollectionTable (450) contains:

.1.3.6.1.4.1.1977.22.10.13.1.1.587=cluster_node01, Server1,SipContainerModule
.1.3.6.1.4.1.1977.22.10.13.1.1.588=cluster_node02, Server2,SipContainerModule
.1.3.6.1.4.1.1977.22.10.13.1.1.589=cluster_node03, Server3,SipContainerModule A monitoring agent (320) per cluster operates on the system (165) on which the deployment manager is also being executed. In one embodiment, the monitoring agent collects, by performing SNMP get operations, the per-cluster KPI MIB data from the application agent. The monitoring agent can also be installed on any remote system but having it on same the system (165) where the deployment manager is executing avoids an increase of network traffic. The monitoring agent retrieves the MIB information containing the KPI's and sends the collected information to the remote server (170) of the centralized system management implementation (100).

The application agent also collects topology information describing relationships between clusters/nodes/servers/hostnames and servers/enterprise applications. The topology information is collected by the application agent (300) from the deployment manager through script commands. Thus, the application agent (300) retrieves not only the KPI's from application server 1, application server 2, and application server 3, but also the topology information. Such topology information specifies that server 1 runs on system A, server 2 runs on system B, and server 3 runs on system C, for instance. The topology information is stored on system C independently from the MIB or it can be stored in a separate MIB table. Collection of topology information is typically an expensive operation, and therefore may be performed by the application agent at the request of the monitoring agent only if a new server/enterprise is detected by the monitoring agent in the MIB entry.

In one embodiment, the monitoring agents (320) are modified to interface with one another and also to receive topology information and KPI's. In a method of one embodiment of the invention, the remote server (170) is able to receive performance information from the OS agents (140, 150, 160) and the information from the monitoring agents (320). The information received is transferred to the server (180), which processes the data received from the agents. The system management server application is updated to process the new information and, by using the topology information, to link to the information from the OS agents and to the information from the monitoring agents. Any new information is also archived in the database. The graphical user interface (GUI) server (190) is modified to provide new interfaces to the user; specifically, new reports and graphics are prepared, including KPI information correlated to operating system information that may already be handled with system management applications.

Figure 5A:
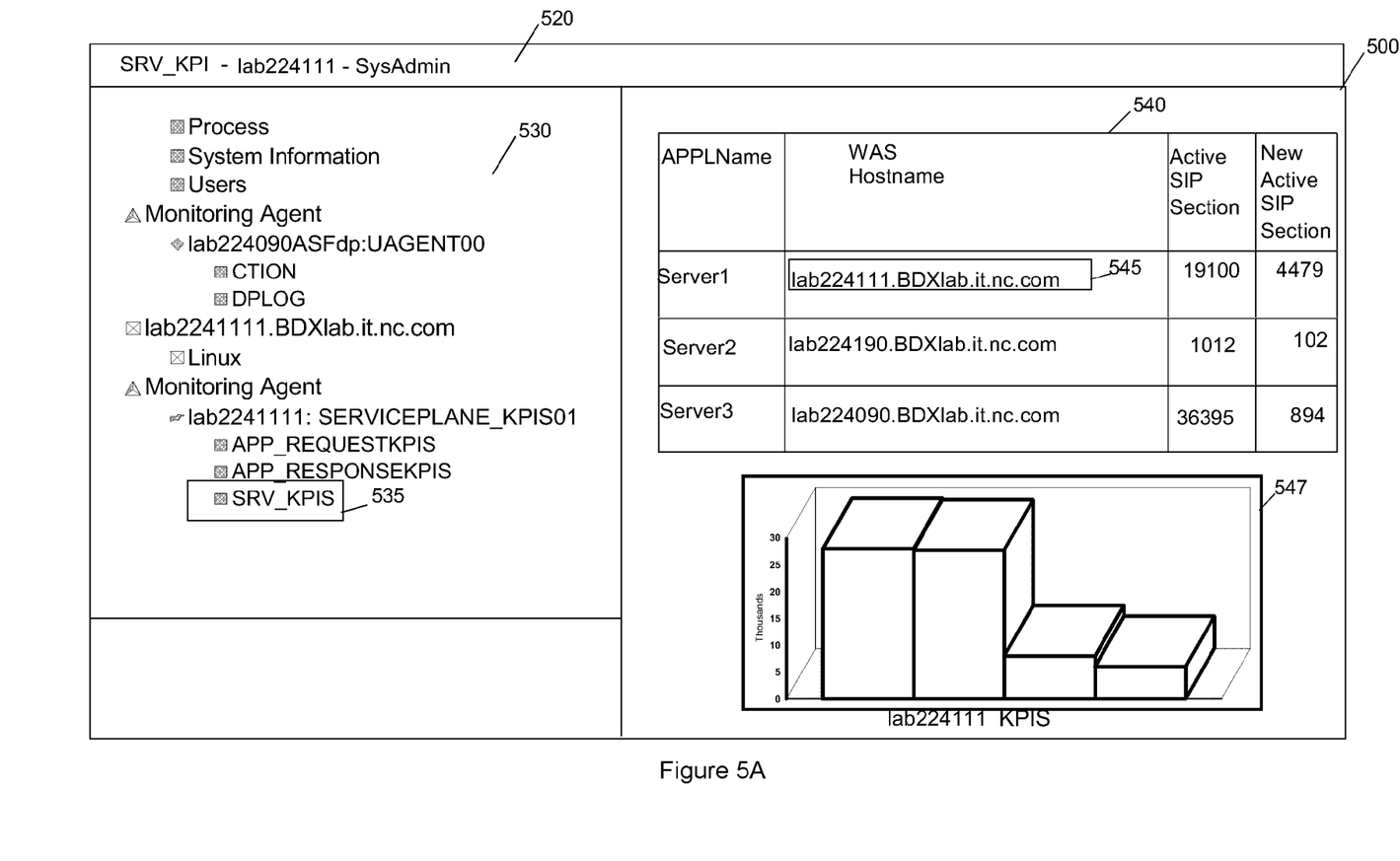
FIGS. 5A and 5B are diagrams depicting an example of a sequence of screenshots as displayed on a system management administrator console, according to an embodiment of the invention.
Figure 5B:
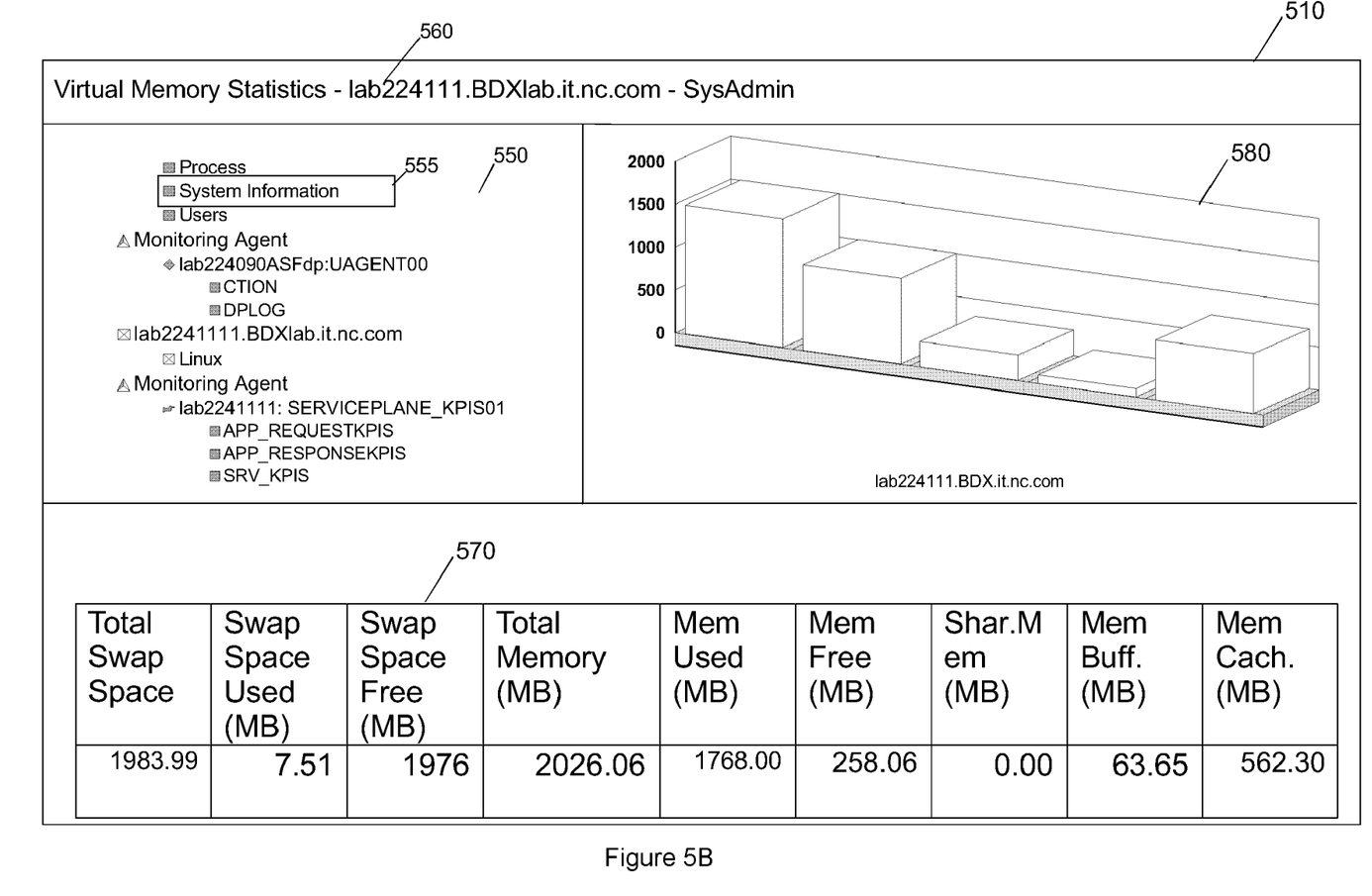

FIGS. 5A and 5B depict one example of navigation as displayed on a system management administrator console, according to an embodiment of the invention. FIG. 5A depicts the first screenshot (500) in the sequence of screenshots displaying KPI views that may be desired by the system administrator on his or her centralized management console (195). The screenshot of FIG. 5A shows a logical structure tree (30) of the components that are monitored by the system management. Under the monitoring agent component, one component is displayed as "lab224111," which represents one service plane member of the cluster. This entity provides KPI's when the system management administrator is interested looking at the KPI's.

When the administrator selects the server KPI's (e.g., SRV_KPI's) (535), the table (540) in the right upper side of the screenshot is displayed. This table shows the KPI related to the servers of the cluster. The system management administrator may then select the row in the table corresponding to "lab224111". The title of the screenshot becomes become "SRV_KPI—lab224111—SysAdmin" (520). The host name in the cluster for this component is "lab224111.BDX.it.nc.com" (545), and operates, as indicated in FIG. 5A, on server 1.

Two examples of KPI's shown in FIG. 5A (just for illustration) are "Active SIP Section" and "New Active SIP Section." These performance indicators are related to the IMS applications for generating this session initiation protocol (SIP) information. The KPI's for this service plane are also illustrated with a graph (547) in the lower right part of FIG. 5A. The system management administrator may request the metrics of the operating system of the corresponding system, such as CPU utilization, or virtual machine (VM) utilization, since such data may explain the degraded KPI for the service plane operating of the corresponding system. In response to the system management administrator selecting the corresponding component (545), the application can link to the metrics of the operating system of the corresponding system.

By leveraging the topology information retrieved from the monitoring agent (320), it is possible to generate the links between the two reports/views of respective KPI and OS performance data, and navigate from one report/view to another report/view without requiring any manual configuration on the part of the administrator. In response to the administrator selecting in FIG. 5A the server name in the cluster (e.g., host name "lab224111.BDXlab.it.nc.com"), the system displays the screenshot of FIG. 5B that shows the metrics view for system A. This is a result of the system management application using the topology information reported by the monitoring agent that indicates that server 1 is operating on system A.

Thus, FIG. 5B illustrates the second screenshot (510) in the sequence of screenshots displaying OS performance data views that can be viewed by the system administrator on the centralized management console (195). FIG. 5B includes the same tree illustrating the structure of logical components (550) as FIG. 5A, and which is managed from the console. By selecting "System Information" (555), the administrator may choose among the metrics provided by the operating system of the system of server 1. In FIG. 5B, however, the administrator has chosen virtual memory statistics information, such that a corresponding screenshot title is displayed (560). The table (570) displayed in the lower part of the screenshot shows virtual memory metrics. A problem in the swap or use of a memory cache may thus be the core cause of the problem with the SIP protocol previously identified by the KPI's of the IMS applications. The same information is displayed as a graph (580) in the upper right part of FIG. 5B.

It is thus possible to navigate between operating system performance information and the KPI's from a unique console for system management. Furthermore, only one application agent and one monitoring agent per cluster are necessary. Embodiments of the invention also provide for other advantages. For instance, application server clustering middleware software, such as an IMS connector, running on top of an operating system may be managed and monitored. Multiple physical systems can be spanned by using a single applicant agent on these different physical systems. As such, just one application agent is needed to manage all the cluster elements, and thus to manage different middleware applications running on different physical systems. A single application agent can support just a subset of operating systems, particularly those belonging to a given cluster.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. For example, while embodiments of the invention have been described in relation to IMS applications, other embodiments can be implemented in accordance with other types of applications, such as applications developed in the Java programming language and within the Java 2 Enterprise Environment (J2EE) platform. Therefore, it is manifestly intended that this invention be limited only by the claims and equivalents thereof.

What is claimed is:

1. A method for managing a heterogeneous environment of applications and application enablers, comprising:
   collecting, by management console hardware including a processor, from an application agent on a physical system hosting a cluster management application and through a plurality of application servers operating on the physical system hosting the cluster management application, performance data of the applications and the application enablers,
      the applications and the application enablers operating on the application servers organized as a cluster, the application servers being managed by the cluster management application, where a system management application running on the management console hardware permits access to computing performance data provided by an operating system of the physical system, collected by an operating system agent installed on the physical system, and reported to the system management application;
   collecting, by the management console hardware through the cluster management application, topology information linking the application servers with the physical system on which the application servers operate;
   retrieving, by the management console hardware, on the physical system hosting the cluster management application the performance data of the applications and the application enablers, and the topology information;
   sending the performance data and the topology information as retrieved, by the management console hardware, to the system management application;
   permitting access, by the management console hardware via the system management application, to the performance data of the applications and the application enablers that have been sent; and,
   using the topology information, by the management console hardware, linking the system management application to the computing performance data provided by the operating system of the physical system on which the applications and application enablers of the cluster operate.

2. The method of claim 1, further comprising, using the topology information, linking the computing performance data provided by the operating system of the physical system to the performance data of the applications and the application enablers that operate on the system.

3. The method of claim 1, further comprising permitting access to the performance data of the applications and the application enablers linked to the computing performance data provided by the operating system of the physical system on which the applications and application enablers operate, via a system management user interface that also allows access to the computing performance data provided by the operating system of the physical system hosting the application servers.

4. The method of claim 3, wherein the system management user interface is a graphical interface to a system management console, and the method further comprises:
   navigating on the system management console from the computing performance data provided by the operating system of the physical system to the performance data of the applications and the application enablers that operate on the system.

5. The method of claim 4, further comprising:
   navigating on a system management console from the performance data of the applications and application enablers that operate on the system to the computing performance data provided by the operating system of the physical system.

6. The computer-readable medium of claim 5, wherein the performance data of the applications and application enablers of the cluster are key performance indicators (KPI's) of the applications and application enablers.

7. The method of claim 1, wherein collecting the performance data and the topology information is performed by an application agent, the application agent being a simple network management protocol (SNMP) agent, the application agent storing the performance data in an SNMP management information base (MIB).

8. The method of claim 7, wherein retrieving the performance data is performed by a monitoring agent utilizing SNMP to retrieve the performance data from the MIB.

9. The method of claim 1, wherein the performance data of the applications and application enablers of the cluster are key performance indicators (KPI's) of the applications and application enablers.

10. The method of claim 1, further comprising:
    processing and archiving the performance data of the applications and the application enablers, and the computing performance data;
    providing access to the performance data of the applications and the applicable enablers, and to the computing performance data, through a user interface.

11. A system comprising:
    a plurality of application servers organized as a cluster, each application server comprising hardware including a processor;
    applications and application enablers operable on the application servers;
    a cluster management application to manage the application servers;
    a system management application to allow access to computing performance data provided by an operating system collected by an operating system agent and reported to the system management application; and, a collection application to collect, via the application servers, performance data of the applications and the application enablers, to collect, via the cluster management application, topology information regarding the application servers, and to send the performance data and the topology information to the system management application, wherein the system management application is adapted to allow access to the performance data of the applications and the application enablers and, using the topology information that has been sent, to allow linking to the computing performance data provided by the operating system.

12. The system of claim 11, wherein the system management application is further adapted to allow, using the topology information, linking the computing performance data provided by the operating system to the performance data of the applications and the application enablers.

13. The system of claim 11, wherein the system management application further is adapted to allow access to the performance data of the applications and the application enablers linked to the computing performance data provided by the operating system of the physical system on which the applications and application enablers operate from a system management user interface that also allows access to the computing performance data provided by the operating system of the physical system hosting the application servers.

14. The system of claim 11, wherein the collection application comprises an application agent that is a simple network management protocol (SNMP) agent, the application agent to store the performance data in an SNMP management information base (MIB).

15. The system of claim 11, wherein the performance data of the applications and application enablers of the cluster comprise key performance indicators (KPI's) of the applications and application enablers.

16. A computer-readable data storage medium having a computer program stored thereon for managing a heterogeneous environment of applications and application enablers operating on a plurality of application servers organized as a cluster, the method comprising:

collecting, from an application agent on a physical system hosting a cluster management application and through a plurality of application servers operating on the physical system hosting the cluster management application, performance data of the applications and the application enablers, the applications and the application enablers operating on the application servers organized as a cluster, the application servers being managed by the cluster management application, where a system management application permits access to computing performance data provided by an operating system of the physical system, collected by an operating system agent installed on the physical system, and reported to the system management application;

collecting, through the cluster management application, topology information linking the application servers with the physical system on which the application servers operate;

retrieving on the physical system hosting the cluster management application the performance data of the applications and the application enablers, and the topology information;

sending the performance data and the topology information as retrieved to the system management application;

permitting, via the system management application, access to the performance data of the applications and the application enablers that have been sent and; and, using the topology information, linking the system management interface to the computing performance data provided by the operating system of the physical system on which the applications and application enablers of the cluster operate.

17. The computer-readable medium of claim 16, the method further comprising, using the topology information, linking the computing performance data provided by the operating system of the physical system to the performance data of the applications and the application enablers that operate on the system.

18. The computer-readable medium of claim 16, the method further comprising permitting access to the performance data of the applications and the application enablers linked to the computing performance data provided by the operating system of the physical system on which the applications and application enablers operate, via a system management user interface that also allows access to the computing performance data provided by the operating system of the physical system hosting the application servers.

19. The computer-readable medium of claim 18, wherein the system management user interface is a graphical interface to a system management console, and the method further comprises:

permitting navigation on the system management console from the computing performance data provided by the operating system of the physical system to the performance data of the applications and the application enablers that operate on the system.

20. The computer-readable medium of claim 19, the method further comprising:

permitting navigation on a system management console from the performance data of the applications and application enablers that operate on the system to the computing performance data provided by the operating system of the physical system.

* * * * *